Patented Feb. 13, 1934

1,946,597

UNITED STATES PATENT OFFICE

1,946,597

PHONOGRAPH RECORD AND PROCESS OF MANUFACTURE

James E. Symonds, Muskegon, Mich., assignor to United Research Corporation, a corporation of Delaware No Drawing. Application October 17, 1931
Serial No. 569,551

1 Claim. (Cl. 106—1.5)

This invention relates to improvements in phonograph records and to improved compositions and processes for producing such records.

The new phonograph records are moulded from a thermoplastic composition which advantageously comprises a polymerized vinyl ester binder, an inert filler admixed therewith, coloring material to give the record the desired color, and a small amount of a suitable plasticizer. Such a composition, properly compounded, enables superior phonograph records to be made by moulding in presses or dies such as are commonly used for moulding phonograph records from shellac base compositions.

The resinous base or binder employed in the new compositions, and in making the new phonograph records, is a polymerized vinyl ester resin or plastic, made by the polymerization of vinyl esters such as the vinyl ester of acetic acid or monochlor acetic acid, polymerized for example by heat or by actinic rays, etc., to give a polymerization product having thermoplastic moulding properties.

While such vinyl ester resins or plastics can be used alone for making phonograph records, if the resin is of suitable consistency, I find it important for the commercial manufacture of records to use the vinyl ester resin as a binder with inert fillers, particularly with inorganic fillers such as barytes, amorphous silica, etc.

For the manufacture of black phonograph records a suitable coloring material is used which may be a dye but is advantageously an amorphous carbon black.

For the moulding of phonograph records it is essential that the moulding composition have a special degree of plasticity adapting it for the peculiar conditions of phonograph record moulding. I have found that the requisite moulding properties can be imparted by the incorporation of a small and carefully regulated amount of a plasticizer compatible with the resinous binder, which will impart to the plastic composition the proper degree of plasticity and the special moulding properties required for phonograph record moulding.

The amounts of different ingredients can be somewhat varied. The amount of filler, for example, will vary somewhat with the particular filler employed and in general will be sufficient to give to the record the proper wearing properties so that it will resist undue abrasion by the phonograph needle. The nature and amount of coloring material can be similarly varied. The proper amount of plasticizer is determined by adding to the mixture such an amount as will give to the composition the peculiar degree of plasticity required so that it will flow properly during the moulding operation without making the composition too thin or soft. Among the plasticizers which may be employed may be mentioned dibutyl phthalate and dibutyl tartrate.

As an example of the new composition I have found the following ingredients and proportions valuable and advantageous, to wit:

A mixture comprising about 77% of the polymerized vinyl ester of acetic acid, about 20% of amorphous silica, about 0.25% of dibutyl phthalate and about 2.75% of carbon black.

Such a composition, properly compounded to form a substantially homogeneous mixture, can be handled in a manner similar to the handling of shellac base compositions for moulding phonograph records, so that it can be used in dies or presses of the kind heretofore used in moulding shellac base records.

The new composition, and the phonograph records made therefrom, have important advantages. The compositions, after compounding, and the uniform intermixture of the ingredients, can be subdivided into masses, each sufficient in size for moulding a phonograph record, and then heated on a hot plate to a thermoplastic condition well adapted for use in phonograph moulding dies and presses.

Such a composition can be readily and rapidly moulded in a phonograph record die or press, taking the impression with a high degree of accuracy. The composition is sufficiently thermoplastic to enable rapid moulding, both to form the detailed and accurate impressions and to retain these on rapid cooling.

As an example of the moulding of the composition and the production of the new records, a dough-like mass of the composition, heated on a hot plate to a thermoplastic and mouldable state, is inserted in the phonograph record mould or die and heated therein to a temperature e. g. of about 320° F. and under a pressure e. g. of 900 pounds to the square inch, the heating is then discontinued and the composition rapidly cooled in the press or die and the finished record then discharged therefrom. The composition is well adapted for rapid moulding for the production of phonograph records, requiring e. g. a moulding time of only forty seconds.

The composiiton, moreover, retains thermoplastic properties even after moulding, so that the excess or waste material as well as defective or imperfect records can be reclaimed by forming again into a plastic mass and remoulded, usually by admixture with fresh moulding composition. Loss of the composition is thus reduced to a minimum.

The composition has the further advantage that it does not affect in any objectionable and deleterious way the dies used in moulding the records and does not objectionably stick to the dies, while nevertheless taking the fine and delicate impressions of the grooves and ridges of the die, conforming to the shape of the sound wave to be reproduced from the die. The dies commonly used for moulding phonograph records are composed of electrodeposited nickel or the like and are peculiarly susceptible both to chemical attack and to mechanical abrasion or wear, but the new composition has advantageous properties such that it does not objectionably affect such die surfaces.

The resulting phonograph records are of substantially uniform composition throughout. The records may be made thin and of light weight while nevertheless retaining the desirable properties required in a phonograph record, not only from the standpoint of mechanical handling of the records but from the important standpoint of presenting a smooth and true reproduction of the sound waves recorded thereon.

With the quantity of filler which will impart the desired degree of resistivity to abrasion under the phonograph needle, and with the proper amount of plasticizer to impart the desired valuable plastic properties for moulding, the composition can be readily and rapidly moulded, and records produced which are highly resistant to fracture, which have excellent wearing qualities, which may be very thin and therefore exceptionally light in weight, which have valuable non-hygroscopic properties and do not deteriorate when exposed to an unusual degree of heat or moisture.

I claim:

A thermo-plastic composition for moulding phonograph records comprising about 77% of the polymerized vinyl ester of acetic acid, about 20% of amorphous silica, about .25% of dibutyl phthalate and about 2.75% of coloring matter.

J. E. SYMONDS.